Aug. 4, 1936.                    W. C. VAN DRESSER                    2,049,551
                                 CUSHION CONSTRUCTION
                                 Filed Feb. 10, 1932              2 Sheets-Sheet 1
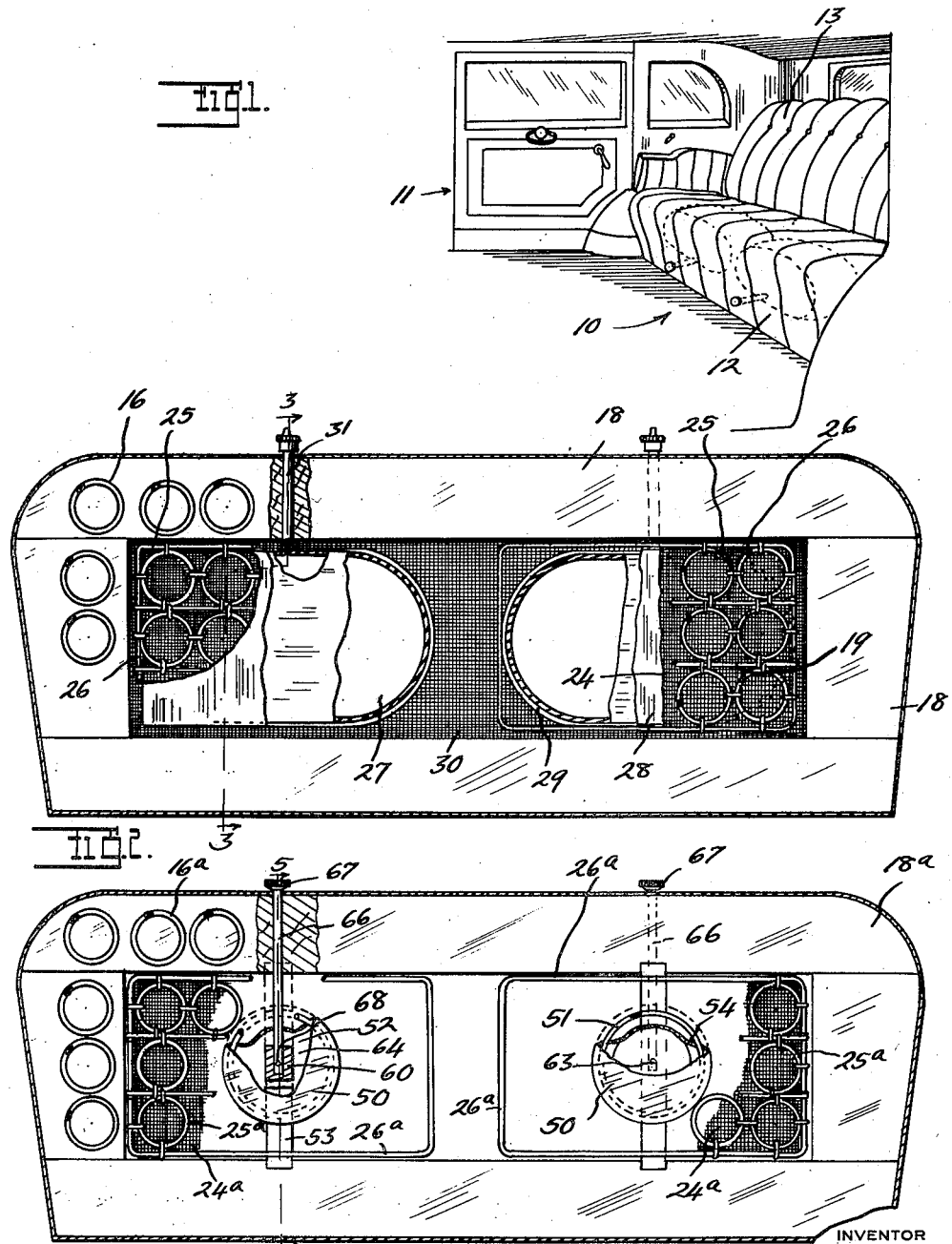
INVENTOR
William C. Van Dresser
BY
ATTORNEYS Aug. 4, 1936.   W. C. VAN DRESSER   2,049,551
CUSHION CONSTRUCTION
Filed Feb. 10, 1932   2 Sheets-Sheet 2
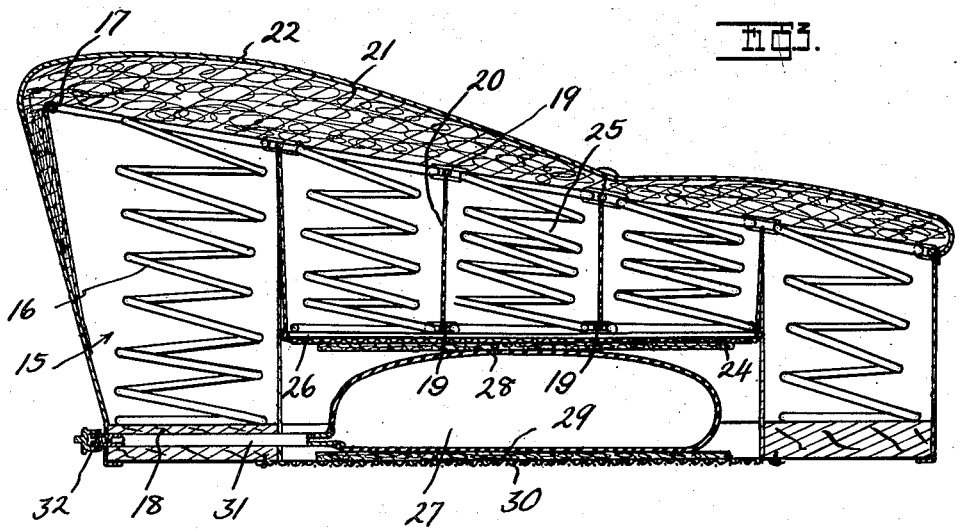
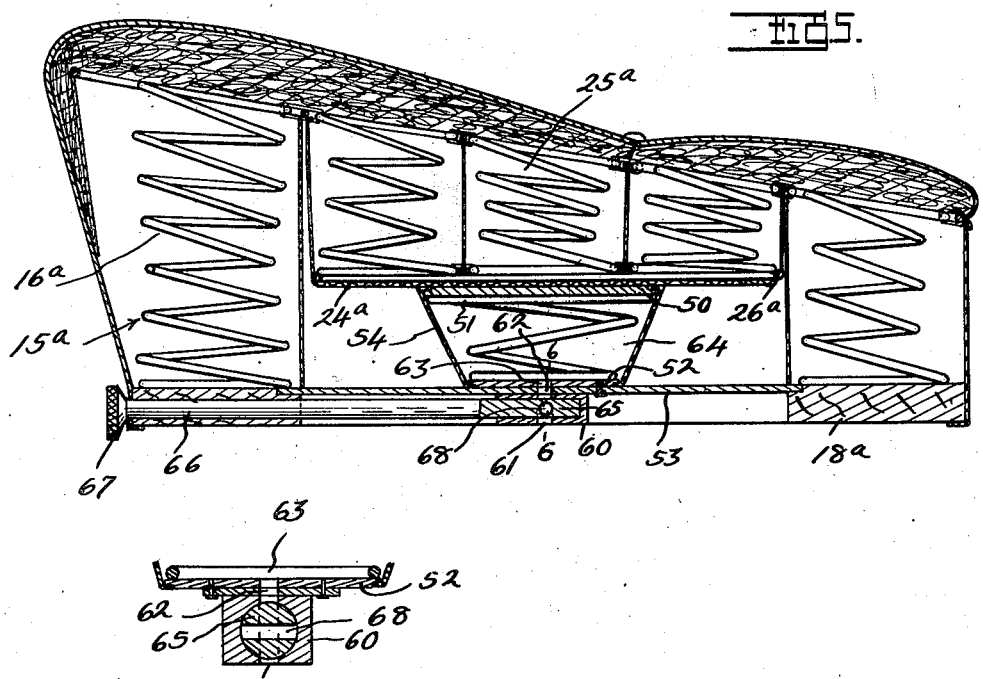
INVENTOR
William C. Van Dresser
BY
ATTORNEYS Patented Aug. 4, 1936

2,049,551

UNITED STATES PATENT OFFICE 2,049,551

CUSHION CONSTRUCTION

William C. Van Dresser, Detroit, Mich., assignor to Van Dresser Specialty Corporation, Detroit, Mich., a corporation of Michigan Application February 10, 1932, Serial No. 592,117

8 Claims. (Cl. 155—179)

This invention relates to a cushion construction of the character in which a plurality of coil springs or the like are grouped to form a unit, which unit is then suitably covered by upholstery material or the like.

One of the primary objects of this invention is to provide means for adjusting the firmness of a cushion of the above mentioned character whereby the cushion may be adapted to persons of different weights.

Still further the invention contemplates the provision of means whereby the above mentioned adjustment may be readily made.

The invention further contemplates the provision of a cushion which will be simple in construction and which may be readily manufactured on a commercial scale.

Numerous other objects and advantages of this invention will become more apparent as the following description proceeds, particularly when reference is had to the accompanying drawings, wherein:

Fig. 1 is a fragmentary perspective view of a vehicle showing a cushion constructed in accordance with the teachings of this invention installed in the same;

Fig. 2 is a horizontal sectional view with parts broken away through a cushion construction embodying the invention;

Fig. 3 is a sectional view taken substantially on the line 3—3 of Fig. 2;

Fig. 4 is a sectional view similar to Fig. 2 showing a slightly modified form of construction;

Fig. 5 is a sectional view taken substantially on the line 5—5 of Fig. 4; and

Fig. 6 is a sectional view taken substantially on the line 6—6 of Fig. 5.

In its broader aspects the invention contemplates the provision of a plurality of coil springs or the like grouped to form a spring unit, means providing a yieldable support for one or more of the springs of this unit and means for adjusting the yieldability of this support. More particularly the invention contemplates providing a fluid cushion support for certain of the coil springs and providing means for adjusting the firmness of this fluid cushion.

Referring then particularly to the drawings wherein like reference characters designate corresponding parts throughout all views, there is shown in Fig. 1 of the drawings a rear seat 10 of a vehicle designated generally by the reference character 11. The seat comprises a seat cushion 12 and a back cushion 13. The invention will be described as being incorporated in the seat cushion 12 although it is to be understood that the invention will find equal utility when incorporated in the back of the vehicle seat, and that further, the invention may be incorporated either in the rear seat of the vehicle or the front seat thereof.

The seat cushion comprises a spring unit designated generally by the reference character 15, this spring unit comprising a plurality of coil springs 16 arranged in longitudinal and transverse rows. The unit is preferably provided at its top with a border frame 17 to which the border coil springs 16 are secured, and a border base frame 18 on which the border coil springs of the unit are supported.

The spring unit may be of any general construction and is shown as including coil spring cables 19 disposed at the upper and lower ends of certain of the coil springs of the unit yieldably connecting these springs to each other. Corresponding cables on opposite sides of the unit are connected by listings 20, with the result that these particular springs of the unit may, if desired, be held partly under compression. The spring unit is suitably covered by padding 21 and a cover 22 of upholstery material.

According to the teachings of this invention, a plurality of the coil springs forming the spring unit are supported on a yieldable support, the yieldability of which may be adjusted to vary the firmness of the cushion. Thus, as illustrated in Fig. 2 of the drawings, a plurality of the coil springs, constituting a group arranged substantially centrally of the unit adjacent one end thereof, are formed of less length than the remaining springs of the unit. These springs are designated by the reference character 25 and may if desired be of lighter gauge than the remaining springs of the unit, although this is not essential. Any number of springs may be included in this group, and the border springs of this group are preferably connected at their lower ends to a border frame 26. Secured in any desired manner at its edges to this border frame is a wire screen 24 which constitutes a support for the lower ends of the springs 25.

It will be understood that the frame 26 and the screen secured to the same constitute a floating support for the springs 25, and for yieldably mounting this support, there is provided a pneumatic cushion 27. A felt pad or the like 28 is preferably positioned between the upper face of this pneumatic cushion and the screen 24 to eliminate wearing of the pneumatic cushion incident to friction.

The pneumatic cushion, which may be conveniently made of rubber, is in turn supported within the seat cushion by means of a felt pad or the like 29 which in turn is supported on a screen 30 secured to the border base frame 18. The screen 30 provides for the admission of air to and the exhaust of air from the interior of the seat cushion to prevent the same from becoming air-bound.

The cushion 27 provides a fluid cushion and is provided with a valve stem 31 of any suitable construction, this valve stem projecting forwardly from the cushion and through the front frame member 18 to a position where its inlet end is accessible from the front of the seat cushion. A suitable one-way valve 32 of the type generally used in the valve stems of pneumatic tires is located in the end of the valve stem 31, as clearly illustrated in Fig. 3 of the drawings.

It will be understood that the springs 25 are supported as a unit on the rubber cushion 27 and that the lower ends of these springs are flexibly connected to each other by the coil spring cables 19. Thus the pneumatic cushion constitutes a yieldable support for these springs and by inflating or deflating the cushion the yieldability of this support may be adjusted. Thus for a heavy person the cushion may be inflated to increase the air pressure therein, thus rendering the support for the springs 25 firmer, while for a lighter person or if it is desired to make this portion of the seat cushion softer, the cushion 27 may be slightly deflated, thus making softer the support for the springs.

It will be understood that the valve 32 provides for the inflating of the cushion to the desired extent so that the adjustment may be readily made to give the desired softness or firmness to the cushion. As illustrated in Fig. 2 of the drawings, there are preferably two groups 25 within the seat cushion, one of these groups being disposed at each end of the cushion at the locations within the cushion where persons riding in the vehicle normally sit.

In Figs. 4 to 6, inclusive, of the drawings a slightly modified form of construction is disclosed, this form also, however, utilizing a fluid cushion for yieldably supporting certain of the springs. By reference to these figures it will be noted that there is provided a spring unit 15ª formed of coil springs 16ª arranged in transverse and longitudinal rows. Relatively short springs 25ª are arranged in groups within this spring unit, and these springs are connected at their lower ends to border frames 26ª, there being a wire screen 24ª secured to each border frame, which screen aids in supporting the springs 25ª of its respective group.

In this form of construction, however, there is disposed beneath the screen of each frame a circular metal disk 50 of a size sufficient to underlie the lower ends of two or more of the coil springs of the group. This disk is preferably welded to the upper end of a coil spring 51 which is preferably of heavier gauge than the coil springs 25ª of the group. The lower end of the spring 51 is in turn welded to a metal disk 52 which is bolted or otherwise secured to the upper face of a bar 53 secured to the border frame 18ª. The spring 51 is preferably enclosed by an imperforate flexible cover or shield 54 which may be formed of canvas, rubber or the like and which is cemented at its upper and lower edges to the disks 50 and 52 respectively. This shield together with the disks thus provides an air-tight housing or container for the spring 51.

Secured to the lower face of the bar 53 is a valve casing 60 provided with a bore 61 which communicates by means of openings 62 and 63 in the bar 53 and disk 52, respectively, with the interior of the chamber 64. Rotatably journaled within the valve casing is a valve member 65 having a stem 66 which projects forwardly through the frame member 18ª disposed at the front of the cushion and which is provided at its end with a suitable knob or the like 67. The valve member 65 is provided with a bore 68 which, upon rotation of the valve member, may be aligned with the bore 61. The chamber 64 thus constitutes a yieldable support for the springs 25ª, and the yieldability of this support may be adjusted by the valve 65.

In operation, it will be understood that the chamber 64 constitutes in substance a dash pot, the venting of which may be controlled by actuation of the valve 65 within the casing 60. Thus, if the valve is turned to close the bore 61 in the manner illustrated in Fig. 6 of the drawings, the chamber 64 is made substantially rigid to thus provide a rigid support for the group of springs 25ª. The valve, however, may be adjusted to provide for any desired venting of the chamber 64, with the result that the rigidity of this chamber as a support may be adjusted as desired.

It will be apparent that for extremely heavy persons, the valve 65 will be turned to provide but a slight opening into the chamber 64, with the result that this chamber will constitute a relatively rigid support for the group of springs 25ª. For a lighter person, or if it is desired to render the cushion softer, the valve 65 may be opened wider to provide for a more ready exhausting of air from the chamber 64, with the result that this chamber will become a more yieldable support. Thus the venting of the chamber 64 as controlled by the valve 65 will predetermine the rigidity of this chamber as a support and thus the firmness or softness of the group 25ª.

From the above it will be apparent that the invention provides a spring unit together with means for varying the firmness of this unit. One or more groups of springs may be arranged within the spring unit for support by the adjustable supporting means provided.

While the invention has been described with some detail, it is to be understood that the description is for the purposes of illustration only and is not definitive of the limits of the inventive idea. The right is reserved to make such changes in the details of construction and arrangement of parts as will fall within the purview of the attached claims.

What I claim as my invention is:

1. In a cushion construction, a plurality of coil springs assembled in a group for limited movement with respect to each other to form a spring unit, certain of said coil springs disposed substantially centrally of said unit being shorter than the remaining springs of said unit to provide a space within the cushion construction and below said relatively short coil springs, an air cushion disposed in said space and constituting a support for the lower ends of said relatively short springs, means secured to the base of said cushion construction for holding said air cushion in position, and a valved inlet stem for said air cushion providing for the inflation and deflation thereof.

2. In a cushion construction, a plurality of coil springs grouped to form a spring unit, means including a collapsible air chamber providing a yieldable support for certain of said coil springs, a spring within said air chamber for normally maintaining the same expanded, and a valve adjustable to control communication between the interior of said air chamber and the atmosphere.

3. In a cushion construction, a plurality of coil springs grouped to form a spring unit, and an adjustable yieldable support for certain of the springs of said unit comprising a coil spring, disks secured to the ends of said spring, an imperforate flexible shield secured to said disks and enclosing said spring providing an air-tight chamber around said spring, and a valve controlling communication between said chamber and the atmosphere.

4. In a cushion construction, a plurality of coil springs grouped to form a spring unit, certain of said springs disposed substantially centrally of said unit being shorter than the remainder of the springs of said unit to provide a space within said unit substantially centrally thereof and below the said shorter springs, a bar fixed to the base of said unit and spanning the space formed therein, a metal disk fixed to the upper face of said bar, a spring fixed to the upper face of said metal disk, a second metal disk fixed to the upper end of said spring and constituting a support for the lower ends of said relatively short springs, a flexible member fixed to said disks and providing an air-tight chamber surrounding said spring, a valve casing secured to said bar and having a bore in communication with the atmosphere and with the interior of said chamber, and a rotatable valve disposed in said valve casing and having a bore adapted to be brought into registration with the bore in said valve casing.

5. In a cushion construction, a plurality of springs grouped to form a unit, and an adjustable yieldable support for said springs comprising a coil spring, members secured to the end of said spring, a flexible shield secured to said members and enclosing said spring providing an air-tight chamber around said spring, and a valve controlling communication between said chamber and the atmosphere.

6. In a cushion construction, a plurality of springs grouped to form a unit, means including a fluid cushion providing a yieldable support for said group of springs, means for adjusting the yieldability of said fluid cushion, a series of border springs surrounding said group of springs, and means providing an unyieldable support for said border springs.

7. In a cushion construction, a plurality of springs grouped to form a unit, means including a fluid cushion providing a yieldable support for said group of springs, means for adjusting the yieldability of said fluid cushion, a series of border springs surrounding said group of springs, a base frame constituting an unyieldable support for said border springs, an upholstery covering secured to said base frame and enclosing said group of springs and said border springs, and means secured to said base frame for supporting said fluid cushion.

8. In a cushion construction, a substantially rigid base, a cover secured to said base, a coil spring having its one end engaging the inner surface of the cover and having its other end spaced from the base, a fluid cushion disposed between the said base and the last mentioned end of the spring and constituting the sole means for supporting the spring from the base, and means for adjusting the yieldability of said fluid cushion.

WILLIAM C. VAN DRESSER.